United States Patent [19]

Clark et al.

[11] Patent Number: 4,741,788
[45] Date of Patent: May 3, 1988

[54] METHOD OF AND APPARATUS FOR SPIN-WELDING

[75] Inventors: Kenneth R. Clark; Malcolm G. Collins; Keith E. Nuttall, all of Oxfordshire; Suresh G. Panvalkar, Wiltshire, all of England

[73] Assignee: Metal Box p.l.c., Reading, England

[21] Appl. No.: 864,140

[22] Filed: May 16, 1986

[30] Foreign Application Priority Data

May 24, 1985 [GB] United Kingdom ............ 8513240

[51] Int. Cl.$^4$ ............................................ B29C 65/06
[52] U.S. Cl. .................................... 156/64; 156/69; 156/73.5; 156/294; 156/358; 156/378; 156/423; 156/580; 264/68; 228/2; 228/112
[58] Field of Search .............. 156/73.5, 580, 69, 294, 156/423, 64, 378, 358; 228/2, 112, 113; 264/68

[56] References Cited

U.S. PATENT DOCUMENTS

| | | | |
|---|---|---|---|
| 3,338,775 | 8/1967 | Down et al. ........................ | 156/582 |
| 3,499,068 | 3/1970 | Brown ................................. | 156/73.5 |
| 3,607,581 | 9/1971 | Adams ................................ | 156/580 |
| 3,623,213 | 11/1971 | Sciaky et al. ..................... | 228/2 |
| 3,623,214 | 11/1971 | Sciaky et al. ..................... | 228/2 |
| 4,090,898 | 5/1978 | Tuskos ............................... | 156/73.5 |
| 4,252,587 | 2/1981 | Harden et al. .................... | 228/2 |

FOREIGN PATENT DOCUMENTS 2174672 11/1986 United Kingdom .

*Primary Examiner*—Michael Wityshyn
*Attorney, Agent, or Firm*—Diller, Ramik & Wight

[57] ABSTRACT

During spin-welding of an end ring to a container body, the weld area is subjected to a radial pressure by means of a wire cable tourniquet under the action of a pneumatic cylinder. The interference fit between the ring and body is measured by reference to the torque required for their slow speed relative rotation or to the axial force required for their assembly and, according to the measured interference fit, the radial pressure applied by the tourniquet during welding is controlled.

10 Claims, 7 Drawing Sheets

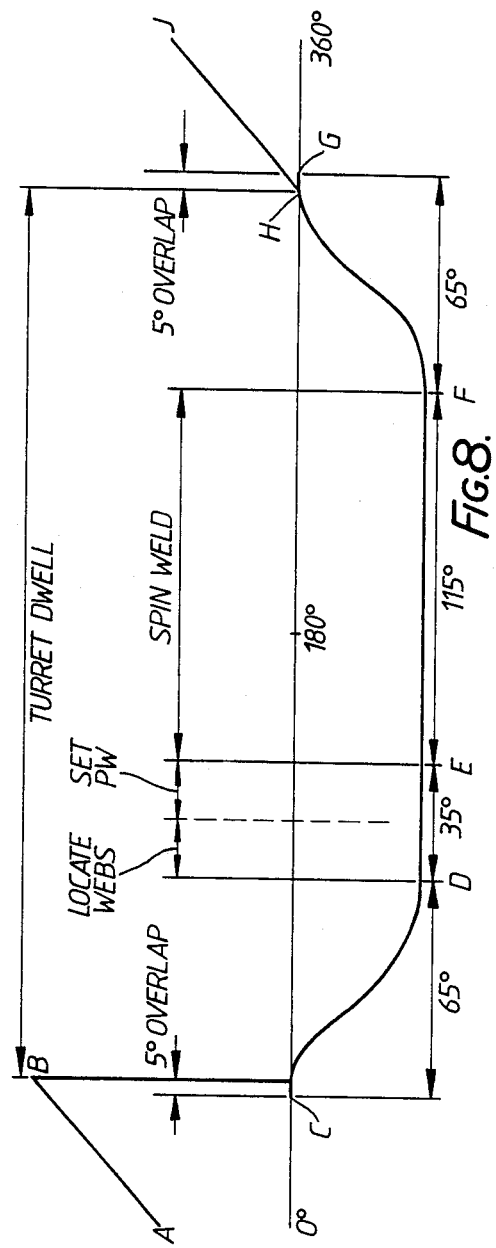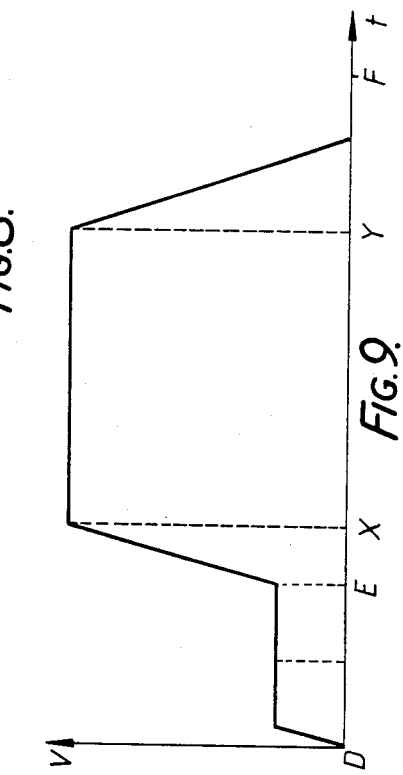

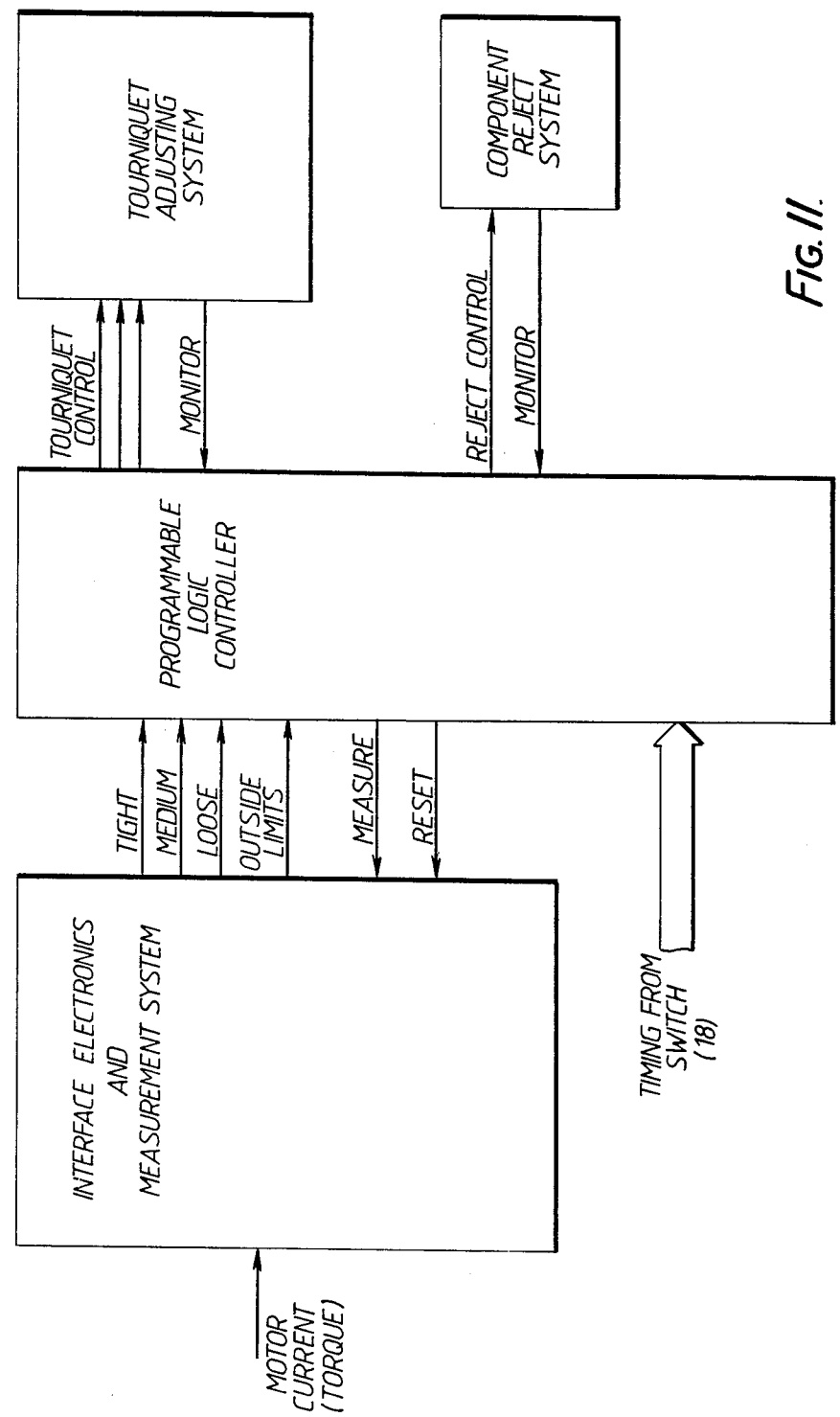

METHOD OF AND APPARATUS FOR SPIN-WELDING

BACKGROUND OF THE INVENTION

The invention relates to spin-welding, which is a known technique for welding together plastics components which are assembled with opposed annular surfaces, in which one of the components is spun at high speed relative to the other to cause melting and subsequent fusion of the plastics material at the interface of the opposed surfaces.

DESCRIPTION OF THE PRIOR ART

Our co-pending British Patent application No. 8510817, published on Nov. 12, 1986 as No. GB-A-2174672, describes a method of spin welding a plug fit end component within a side wall for a container. During spinning, the end component and container body are urged together by both axial and radial forces. The radial forces acting on the surfaces to be welded are the result of an interference fit between the components and an external radial compressive force which is applied during welding. Due to the variations in size of each component, manifest in plastic moulding tolerances, the interference fit between any two components may vary considerably. Such differences in component size can occur, for example, through inconsistencies in any one polymer grade used and also, more importantly, as a result of the general industrial practice of basing plastics moulding production on at least two alternative grades of polymer from different suppliers, such grades often exhibiting significantly different mould shrinkage characteristics when converted into moulded articles.

Significant dimensional variation in mouldings may also arise from alteration of mould cycle time, injection pressure, melt temperature and temperature of any cooling water used as is well understood in the art.

Since the rate of frictional heat generation during the spinning of the components is directly proportional to the contact pressure between the welding surfaces, for any one chosen set of welding conditions defining spin duration and speed, the weld quality can range from a tacky weld, as a result of insufficient melt being formed at the interface between excessively loose fit components, to a fully-fused weld with massively excessive melt formation between excessively tight fit components. In the latter case, it is possible to over-weld to such an extent that any anti-flash features provided adjacent the main weld area become overwhelmed by the melt produced to such an extent that aesthetically unacceptable debris or flash becomes visible on the external surface of the finished article.

The ideal axial pressure needed to maintain the components in their assembled condition and, where necessary, to cause a small inward progression of one component relative to the other for reasons associated with anti-flash measures, will also vary according to the contact pressure between the opposing surfaces during welding.

SUMMARY OF THE INVENTION

The object of the present invention is to provide a method and apparatus for spin-welding together two opposed annular surfaces of plastic components wherein the contact pressure between the two opposed surfaces during spin-welding is maintained approximately equal to a predetermined value, despite the variations in size of each component which result from the normal plastics moulding tolerances, through the controlled application of a radial pressure.

According to a first aspect of the invention there is provided a method of spin-welding together two opposed surfaces of thermoplastics components which when assembled together prior to welding have an interference fit, the method comprising the steps of:

(a) engaging the components with one another and moving them into the assembled position;

(b) applying a radial pressure to the assembled components in the region of the opposed surfaces; and (c) whilst the radial pressure is applied, spinning the components relative to one another at a speed and for a time sufficient to cause welding of the opposed surfaces;

(d) measuring a parameter which is a function of the force required to cause relative movement of the engaged components before applying the radial pressure; and (e) selecting the value of the radial pressure applied according to the value of the measured parameter such that the contact pressure between the opposed surfaces is controlled during welding.

According to a second aspect of the invention, there is provided apparatus for spin-welding together two opposed surfaces of thermoplastics components which when assembled together prior to welding have an interference fit, comprising means for applying a radial pressure to the assembled components in the region of the opposed surfaces, means for spinning the components relative to one another while subjected to the radial pressure, means for measuring a parameter which is a function of the force required to cause relative movement of the engaged components before application of the radial pressure, and means for selecting the radial pressure according to the value of the measured parameter.

One advantage of the invention is that satisfactory welds can be achieved for components over a large range of interference fits. There is a further advantage in the use of an automatically compensating radial pressure, in that combinations of components having different diametric interferences no longer require different axially applied pressures to prevent axial outward displacement of one component relative to the other during the welding cycle.

BRIEF DESCRIPTION OF THE DRAWINGS

FIG. 8 is a graphic representation of the machine cycle;

FIG. 9 is a diagrammatic time/velocity graph for the spin motor of the machine;

FIG. 11 is a block diagram showing the control system for the device shown in FIG. 6.

DETAILED DESCRIPTION OF THE DRAWINGS

Figure 1:
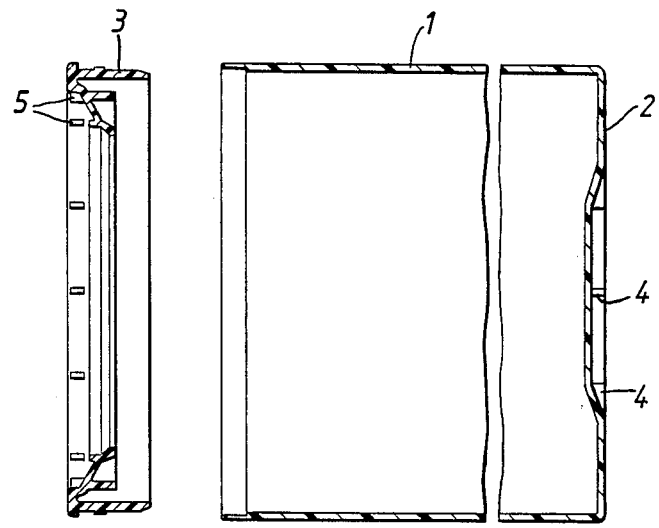
FIG. 1 shows a longitudinal section through a cylindrical container body and an end component therefor.

Referring to FIG. 1, there is shown a container comprising a moulded plastics cylindrical body 1 provided with an integral bottom panel 2 and a plug fit end component in the form of a moulded plastics ring 3 adapted to be assembled into the open end of the body. The bottom panel of the body has a plurality of external webs 4 which engage fixed pins located on the ram of the machine such that they prevent the body rotating during welding. The ring 3 also has a number of external webs 5 which engage one or more driving pins in the spinning head of the machine and thereby provide drive for the spin-welding process. Components such as shown in FIG. 1 are described in greater detail in our co-pending British Patent application No. 8510817.

Figure 2:
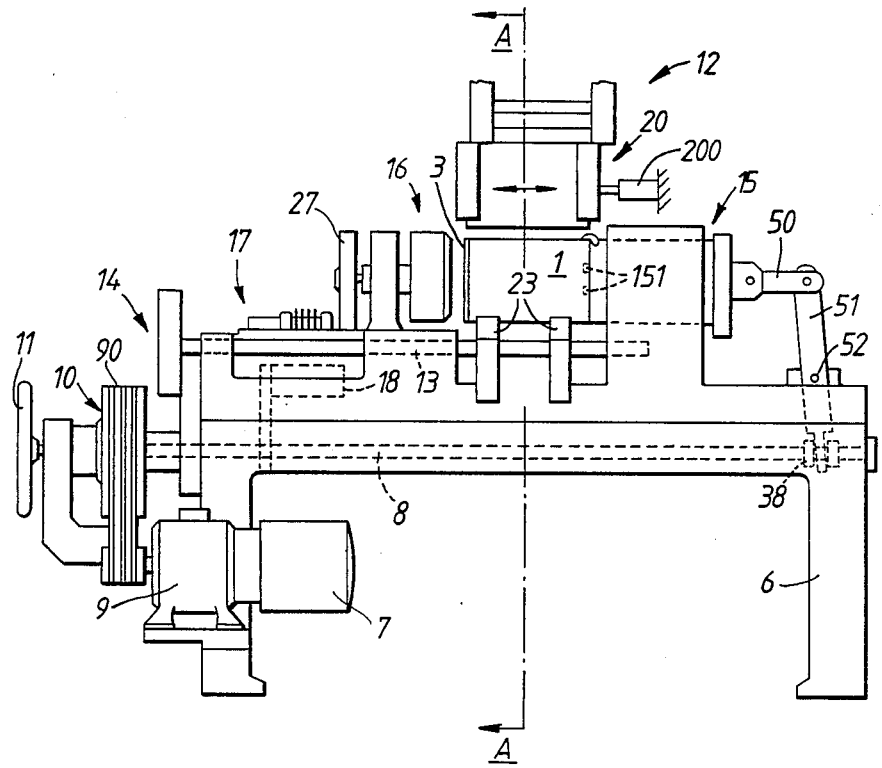
FIG. 2 is a side view of a spin-welding machine.
Figure 10:
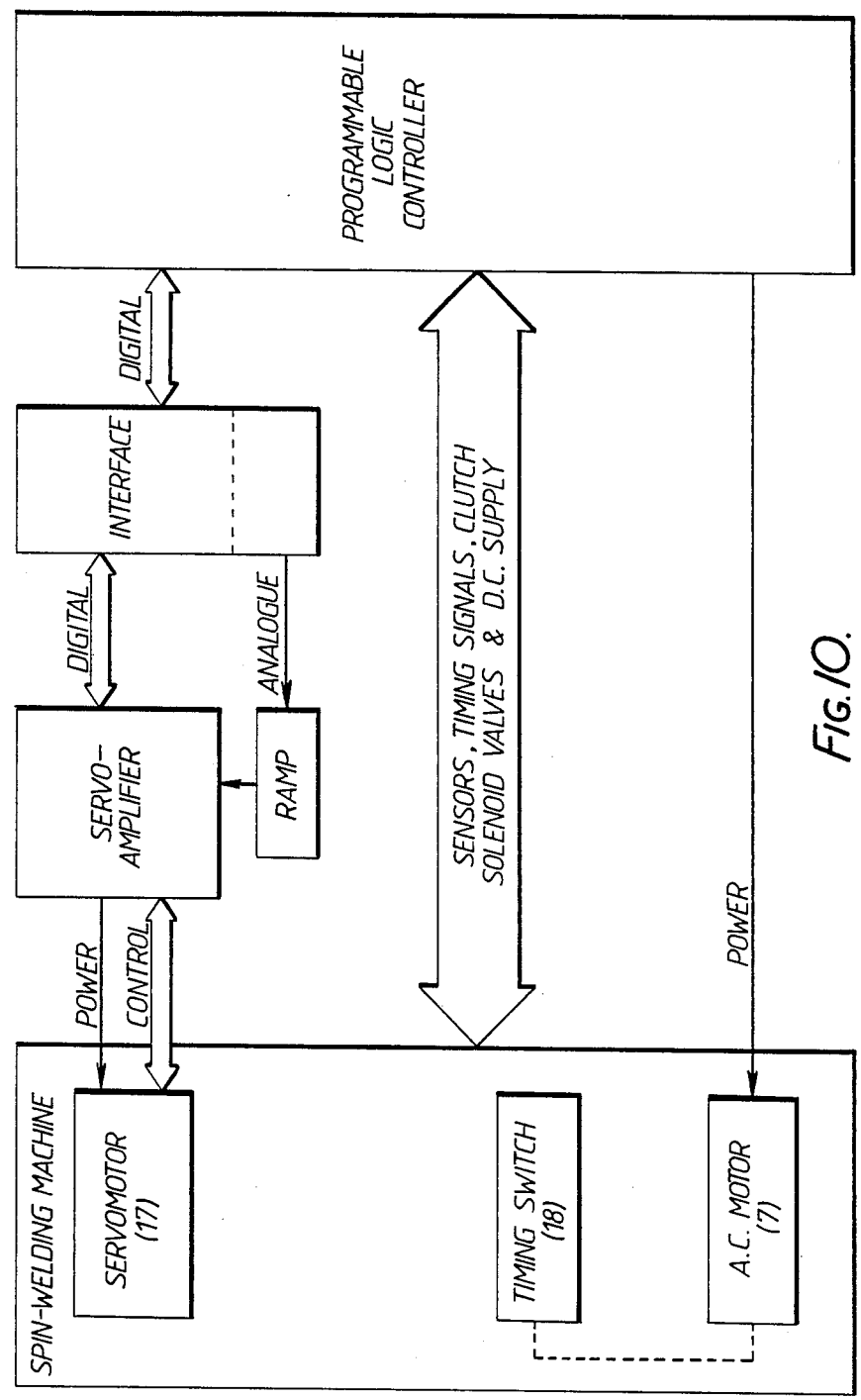
FIG. 10 is a block diagram showing the control system for the spin welding machine.

As shown in FIG. 2, the spin-welding machine is supported on a frame 6 and has a main AC drive motor 7 driving a primary drive shaft 8 through a geared speed reduction unit 9, drive belt 90, and a pneumatic clutch 10. The clutch is remotely operated by a programmable control system (FIGS. 10, 11). A hand wheel 11 may be used for manual rotation of the drive shaft during setting up. A brake (not shown) may also be provided. The feed mechanism 12, by which pre-assembled containers are fed to the work station, is driven from a secondary drive shaft 13 which is itself driven in an indexing motion from the shaft 8 via a Geneva mechanism 14. A ram assembly 15, also driven from shaft 8, is operative to push the container at the work place into and out of engagement with a spin-welding head 16. The spin-welding head is driven by a servo motor 17 controlled by a switch unit 18 driven off the shaft 8.

Figure 3:
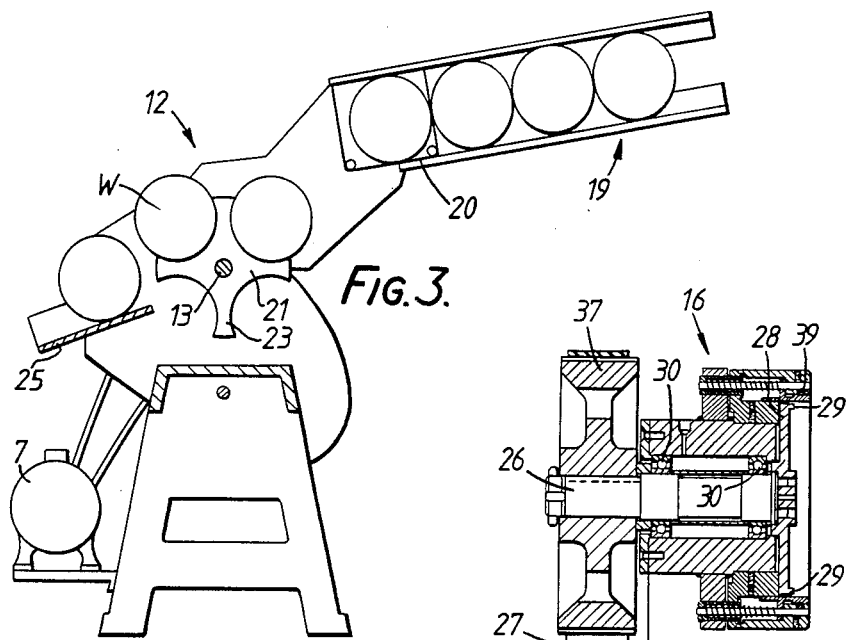
FIG. 3 is a diagrammatic sectional view of the machine of FIG. 2 taken along line A—A.

The body 1 and ring 3 are pre-assembled before welding and are fed to the machine by a feed mechanism shown in FIG. 3. The pre-assembled containers have already been turned on their sides before being fed into the machine so they can roll down the infeed chute 19. A gate 20, which is shown only diagrammatically in FIGS. 2 and 3, stops them before they can reach a transfer turret 21 mounted for intermittent rotation on the secondary drive shaft 13. The gate is timed in sequence with the machine from the switch unit 18 and is operated when the transfer turret has stopped rotating. The gate 20 moves sideways until a container therein is lined up with turret guides. The container is then free to drop under gravity into the transfer turret. The sideways movement of the gate 20 causes it to interfere with the next following container in feed chute 19, preventing it from dropping. After a predetermined period, the gate is returned to its original position, allowing the next container to drop into the gate. A pneumatic cylinder 200 with a solenoid valve (not shown) is used to operate the gate.

Rotation of the transfer turret 21 carries the containers from the infeed to the work station W and then to the discharge chute 25. In this example the interrupted motion of the transfer turret is provided by the Geneva mechanism 14. The transfer turret comprises a pair of plates 23 mounted on shaft 13 and having peripheral part-circular cut-outs therein to support the containers during their travel thereon. Outside guides and a rail prevent the containers being disturbed while the turret rotates.

The spin-welding process is carried out at the work station which is shown at W in FIG. 3. At the work station, the container is held between the spin welding head shown in FIGS. 4 and 5, and the ram assembly 15.

Figure 4:
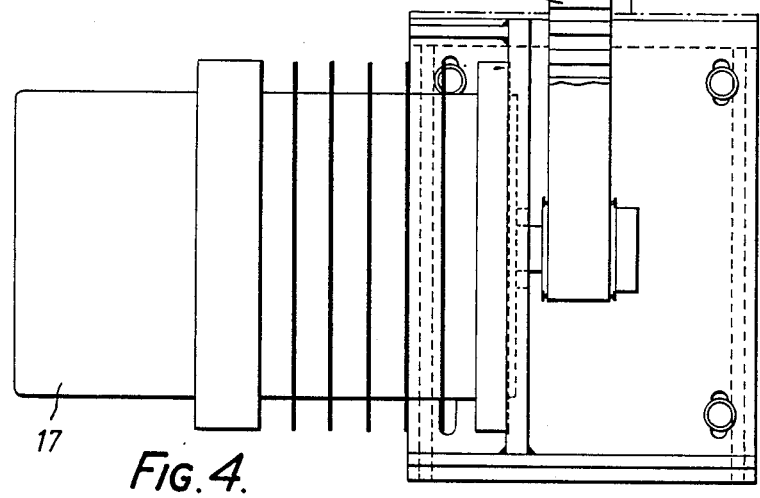
FIG. 4 is a longitudinal sectional view through the spin-welding head of the machine.
Figure 5:
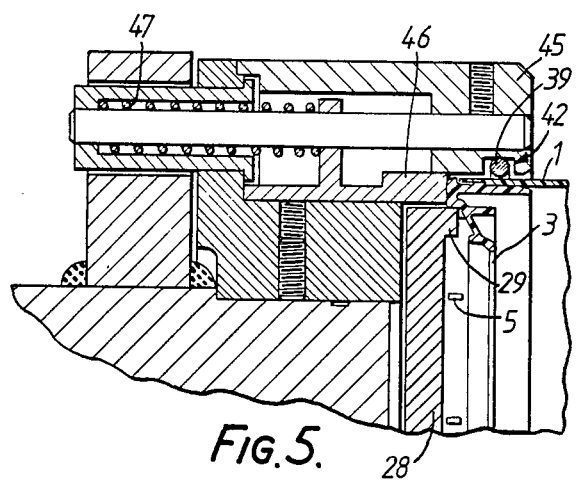
FIG. 5 is an enlarged view of part of the spin-welding head showing a container body and end component engaged therewith.

The spin-welding head comprises a low inertia mechanism driven by a DC low inertia rare earth brushless servo motor 17 as shown in FIG. 4. Drive is taken to the spin welding head shaft 26 via a toothed belt 27. The driven pulley 37 is mounted on one end of the shaft 26 which is horizontal. A disc 28 of lightweight alloy is bolted directly to the opposite end of the shaft 26. Machined in its exposed face, the disc 28 has driving pins 29 which engage in the ring 3 and cooperate with the external webs 5 thereof to cause the ring to be driven in rotation. In order to keep friction as low as possible the shaft 26 is mounted in two ball race 30.

The ram movement, to push a container into the spin welding head, is actuated by a cam 38 (FIG. 2) driven at the machine cycle speed on the shaft 8. This cam action is transferred to the ram slider by a lever arm 51 pivoted at 52 and a connecting link 50. Dogs 151 located on the front face of the ram engage with the webs 4 to prevent the body 1 from rotating during welding.

When the container formed by the assembled container body 1 and end component 3 is pushed by the ram assembly 15 into engagement with the spin-welding head 16, the end face of the end component 3 comes into contact with an ejector ring 46 (FIG. 5) which yields axially under the action of a plurality of coil springs 47 spaced circumferentially around the ring 46. The ring 46 is held in the position shown in FIG. 5 during welding and the correct end pressure for the welding process is provided by the coil springs 47 via the ejector ring.

Radial pressure is applied during the welding process by means of a tourniquet comprising a loop of steel wire cable 39 which is retained in an annular groove 42 in a cable retaining housing 45 mounted on the spin-welding head. When the tourniquet is in a relaxed condition, it forms a loop having a diameter slightly greater than that of the container to be welded. When no container is held in position for welding, the ejector ring moves axially under the influence of the springs 47 to close off the annular groove 42 and to retain the wire cable 39 therein, as shown in FIG. 4.

Figure 7:
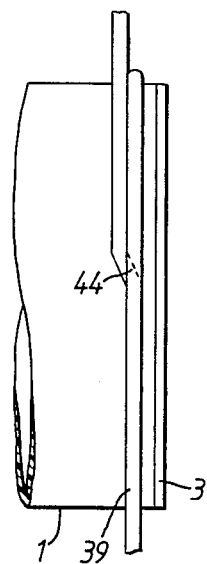
FIG. 7 is a diagrammatic sketch showing the overlap of a wire cable employed in the spin-welding head of the machine.
Figure 6:
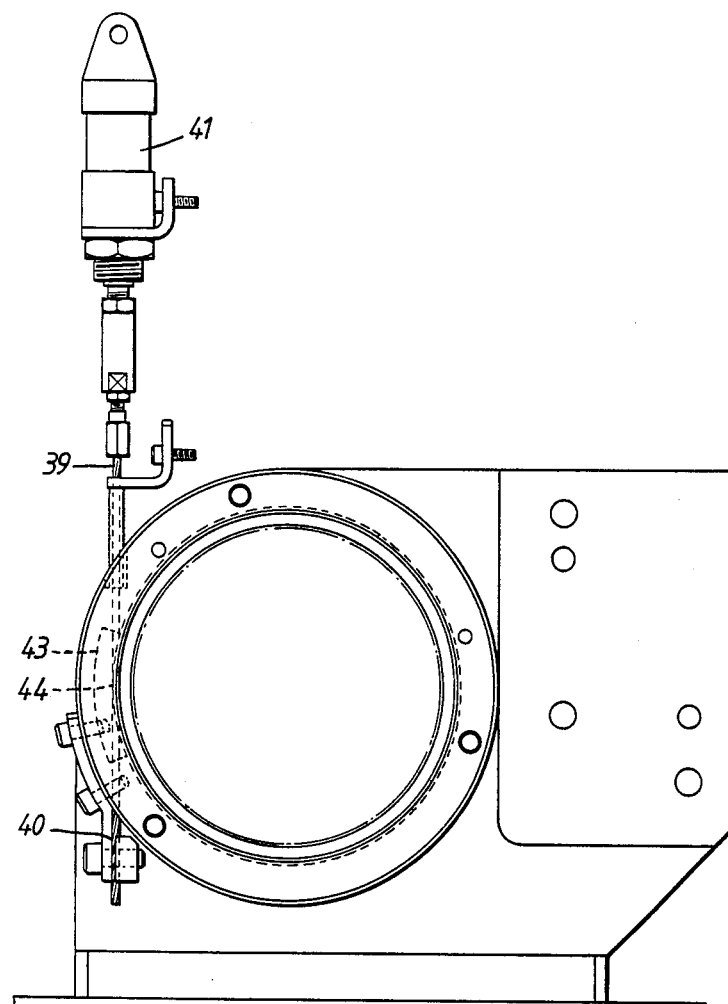
FIG. 6 is a side elevational view of a device for exerting radial compressive pressure which is mounted on the spin-welding head.

As shown in FIG. 6, one end of the cable 39 is rigidly anchored at 40 whilst the other end is attached to a pneumatic cylinder 41. A small release area 43 is cut out of the cable retaining housing 45 to allow the cable to cross over at 44 at the cable's entry and exit points. During the operation of the machine, the assembled container body and end component are fed into the cable retaining housing and through the loop of the cable 39. The driving pins 29 are located as described below and the pneumatic cylinder 41 is operated to apply a tension to the cable such that the cable loop diameter is decreased, thereby producing the desired external pressure on the body 1 necessary for the spin-welding process. After welding, the pneumatic cylinder 41 is returned to its original position, releasing the external pressure and allowing the container to be ejected. As the ram assembly 15 moves back, the ejector ring 46 is free to move forward, thereby pushing the now welded container out of the cable retaining housing and closing the annular groove 42. The manner of overlap of the wire cable is shown more clearly in FIG. 7.

For any given components to be spin-welded, there will be a preferred or medium interference fit which occurs when both components conform exactly to their design dimensions. Due to the variations in component size, within normal plastics moulding tolerances, the interference fit between any two components may differ significantly from the preferred value. A range of interference fits which can lead to successful welds under commercial conditions may be defined as extending from a loose fit having a diametric interference substantially less than the medium fit to a tight fit having a diametric interference substantially greater than the medium fit. The specific values of diametric interference for "loose", "medium" and "tight" fits will, of course, vary according to the nature of the components being welded.

In the case of the components constructed and dimensioned as described in our co-pending British Patent Application No. 8510817, the preferred or medium interference fit between the components is about 0.75 mm (that is, the internal diameter of the body 1 when relaxed is 0.75 mm less than the external diameter of the ring 3 when relaxed). In this case, a loose fit may have a diametric interference of about 0.25 mm and a tight fit may have a diametric interference of about 1.25 mm. As a consequence of these variable degrees of fit between end component and side wall, the contact pressure between the surfaces to be welded, without application of additional radial pressure, can be calculated to range between 0.02 Newtons/mm$^2$ and 0.17 Newtons/mm$^2$.

For one set of welding conditions, for example, derived from experiments using polypropylene rings and bodies, the ideal contact pressure between the surfaces during welding has been found to be about 0.23 Newtons/mm$^2$. It has been shown that for the example quoted, the radial pressure required to maintain the contact pressure between the welding surfaces at about 0.23 Newtons/mm$^2$ needs to be about 0.25 Newtons/mm$^2$ for the loose fit situation of 0.25 mm diametric interference, and about 0.07 Newtons/mm$^2$ for the tight fit situation of 1.25 mm diametric interference. Such pressures enable both extremes of fit to be satisfactorily spin-welded to give a fully-fused integral joint in a total time of about 0.21 seconds at 1000 rpm, wherein 0.05 seconds is required to accelerate the end component to the required speed, and 0.08 seconds is required to electromagnetically brake the system to the stationary position. This total time can be reduced by choosing a greater contact presssure or by increasing the motor speed, or both.

In order for the correct radial pressure to be applied by the tourniquet during welding, it is necessary for the interference fit between the container body and the end component to be measured. Two methods have been shown to be useful and are explained below as examples.

The first is based on the force required to fully assemble the end component into the side wall of the container prior to spin-welding. It has been found that a substantially linear relationship exists between the interference fit and maximum force of assembly, during which the side wall is caused to deform in an elastic fashion because of the diametric interference between the end component and the side wall, although the general shape of the insertion force profile can be influenced by the design of the container and the end component. The measurement of the insertion force may be made on a preliminary assembly machine which fits rings 3 to bodies 1 or at an assembly station that forms an integral part of the spin welding apparatus.

The second method is based on the measurement, on the spin-welding machine itself, of the current required by the spin-welding servo motor to produce a torque sufficient to spin, at a low speed such as 70 rpm, the end component within the side wall when fully assembled. This is a particularly appropriate method since it is convenient to programme the servo motor to spin at such low speed for say 0.10 seconds at the very beginning of the welding cycle to facilitate engagement of the drive webs 5 on the plug by the corresponding drive pins 29 on the spin-welding head before accelerating to the much higher welding speed. The engagement time can be extended for a short period such as 0.1 second during which time the torque required for slowly spinning the end component within the side wall can be measured and related to a diametric interference between end component and side wall by means of a previously established correlation relationship.

For the components shown in FIG. 1, which relate closely to those described in British Patent Application No. 8510817, the current required to slow-spin the end components within the side wall has been shown to vary in an essentially linear fashion with diametric interference between end component and side wall. This relationship can be made even more pronounced if a radial pressure is applied to the side wall during measurement. Thus the degree of fit existing between a container body and an end component therefor to be welded can be measured since different fits will require different currents to drive the servo motor at the chosen fixed low speed.

A voltage is generated by a servoamplifier which is an analogue of the motor current. This measured voltage is received in a control system where it is compared with the voltages predetermined to represent various fit types e.g. loose, medium and tight. Each of the various fit types will in practice represent a band of the full range of possible fits extending from the very loose fit to the very tight fit. The sensitivity of the system will depend on the number of such bands which are distinguished.

The control system will also identify and lead to the ejection of assembled components wherein the interference fit is either so loose or so tight that a satisfactory weld will not be possible under the prevailing operating conditions.

When the type of fit has been identified by the control system, a signal is sent to the machine's pneumatic system, choosing one of a series of solenoid valves that each have had their pressure pre-set to suit one of the fit types. Therefore, in this way, the correct external pressure can be applied by the pneumatic cylinder 41 to the cable 39 for any range of fits between the end components and the container bodies. There is, of course, no limit to the fit types which may be identified in this way and the system can provide a direct correlation between the interference fit of the components and the appropriate corresponding radial pressure to be applied.

Although a measurement of voltage has been used in this example as a means for comparing the torque applied by the motor to spin the end component relative to the container body against the frictional force of the interference fit, other parameters relating to this torque could be measured as an alternative according, for example, to the type of motor employed. Thus a predetermined constant torque may be applied by the motor and the resulting speed of rotation measured.

The drive of the servo motor is governed by an amplifier which can be controlled through a programmable logic controller to provide the required time velocity profile for the motor during the welding process. Operation of the motor 17 is timed to the machine cycle from the switch unit 18. On initiation of the weld process the amplifier is energised and the motor is run at a slow speed for a short time to enable the driving pins 29 of disc 28 to engage the external webs 5 of ring 3 and fixed dogs 151 of the ram to engage the webs 4 on the base of the container. After the webs have been engaged, the current required to run the servo-motor at the predetermined slow speed is measured, to classify the interference fit, and the appropriate radial pressure to be applied by the tourniquet is selected. After this the output of the amplifier is ramped such that the motor is rapidly accelerated to its welding process speed and retained at this speed for a period decided by the nature of the particular container type being welded. At the end of the weld time the amplifier is de-energised and the motor is stopped by the friction generated at the weld. Stopping of the motor can also be assisted by braking or by powered ramping down of the speed.

FIG. 8 is a graphic representation of the machine cycle over one rotation of the primary shaft 8. Lines AB and HJ represent the movement of the turret through one indexed motion (i.e. 90° of the secondary shaft 13). The curves CD and FG represent the forward and return movements of the ram. As can be seen, there is a slight overlap of the ram motion with the movement of the turret. In the period defined between points D and F the ram is stationary in its forward position and during this period the welding takes place. During the period D to E the motor 17 is driven at slow speed to enable the fixed pins 29 on the spin welding disc 28 to locate on the webs 5 of the ring and the dogs 151 on the ram to locate on the webs 4 on the base of the container and to allow the appropriate radial pressure PW to be selected. Between the points E and F the motor 17 is accelerated up to weld speed, retained at weld speed for the required period for welding to occur, and stopped either through friction at the weld or through braking means referred to earlier. FIG. 9 is a diagrammatic time(t)/velocity(v) curve for the motor 17 during the period between the points D and F. From FIG. 9 it will be seen that the motor 17 is stopped before the point F. The period XY during which welding takes place can be altered according to the nature of containers being formed.

The current taken by the motor 17 over the welding period XY may be monitored and compared with a previously established datum. If the load on the motor applied by the weld is below a predetermined level, a satisfactory weld will not be formed. By monitoring the current taken by the motor during the weld period, unsatisfactory welds can be identified and the container rejected.

Suitably, the period defined between the points D and F may be of the order of 0.4 seconds.

Whilst a pneumatic cylinder 41 has been described for applying tension to the cable 39 in order to apply an inwardly directed radial pressure to the wall 1 the cylinder 4 may if desired be replaced by a solenoid or a servo motor system connected directly to the cable.

Whilst the cable 39 is able to apply a narrow hoop of radial pressure to the end wall 1 it may be replaced, if desired by a ring of segments each urged against the wall 1 by, for example, pneumatic or hydraulic means.

FIG. 10 shows diagrammatically the functional inter-relationship between the different parts of the apparatus, and in particular, the control connections between the spin-welding machine and the programmable logic controller.

FIG. 11 is a diagrammatic representation of the system for controlling the application of radial pressure, and shows in particular the control connections between the electronic system for measuring the parameter which represents the interference fit, the programmable logic controller and the tourniquet adjusting system which adjusts the radial pressure applied during welding.

The method and apparatus described are particularly suitable for welding container components made from thermoplastics materials such as polyethylene, polypropylene, copolymers thereof, or polyamides when in a form flexible enough to yield under the imposed inwardly directed radial force to achieve the interference fit necessary for spin welding. Whilst the invention has been described in terms of radially contracting a cylindrical wall against a plug therein, the same controls of inter-component interference may be achieved in principle by spreading the plug against the interior of the cylindrical wall.

We claim:

1. A method of spin-welding together two opposed surfaces of thermo plastics components which when assembled together prior to welding have an interference fit, the method comprising the steps of:
   (a) engaging the components with one another and moving them into an assembled position;
   (b) applying a radial pressure to the assembled components in the region of the opposed surfaces;
   (c) whilst the radial pressure is applied, spinning the components relative to one another at a speed and for a time sufficient to cause welding of the opposed surfaces;
   (d) measuring a parameter which is a function of the force required to cause relative movement of the engaged components before applying the radial pressure; and
   (e) selecting the value of the radial pressure according to the value of the measured parameter such that contact pressure between the opposed surfaces is controlled during welding.

2. A method according claim 1, wherein the measured parameter is a function of the force required to cause relative axial movement of the engaged components towards the assembled position.

3. A method according to claim 1, wherein the measured parameter is a function of the force required to cause relative rotary movement of the engaged components when in the assembled position at a predetermined speed which is low compared with that required to cause welding.

4. A method according to claim 1 wherein the value of the measured parameter is compared with predetermined values of that parameter for assembled components exhibiting different degrees of interference fit and wherein the value of the radial pressure is selected according to that comparison.

5. A method according to claim 4 wherein the predetermined values of the measured parameter include values which relate to assembled components having a diametric interference fit corresponding to one of 0.25 mm, 0.75 mm and 1.25 mm: denoted loose, medium or tight, respectively.

6. A method according to claim 1 wherein the thermoplastics material of the components is chosen from the group consisting of polyethylene, polypropylene, copolymers of polyethylene, copolymers of polypropylene, and polyamides.

7. Apparatus for spin-welding together two opposed surfaces of thermoplastics components which when assembled together prior to welding have an interference fit, comprising means for applying a radial pressure to the assembled components in the region of the opposed surfaces, means for spinning the components relative to one another while subjected to the radial pressure, means for measuring a parameter which is a function of the force required to cause relative movement of the engaged components before application of the radial pressure, and means for selecting the radial pressure according to the value of the measured parameter.

8. Spin-welding apparatus according to claim 7 wherein the means for applying a radial pressure to the assembled components comprises an elongate flexible element formed into a loop surrounding the assembled components in the region of the opposed surfaces wherein one end of the element is fixed and the other end is connected to means for applying tension to the element thereby applying radial pressure to the assembled components.

9. Spin-welding apparatus according to claim 8 wherein the means for applying tension to the element is a pneumatic cylinder operated by one of a series of solenoid valves according to the radial pressure selected.

10. Spin-welding apparatus according to claim 8 wherein the elongate flexible element is a wire cable guided in an annular groove into which it retracts when not in use.

* * * * *